Sept. 3, 1940.   R. D. SEMON   2,213,616
ROTARY TRANSMISSION OR BRAKE
Filed Jan. 16, 1939   3 Sheets-Sheet 1
FIG_1_
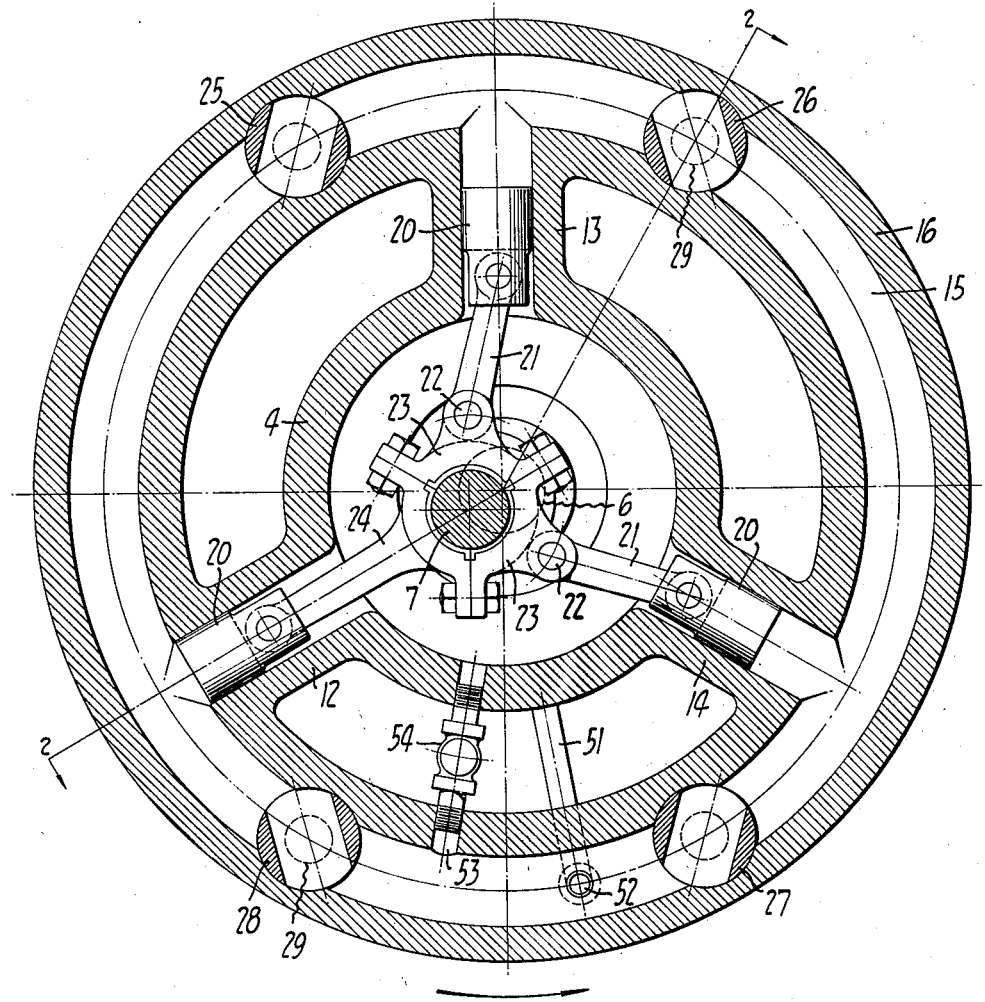
INVENTOR.
Russell D. Semon
BY Boyken & Mohler
ATTORNEYS.

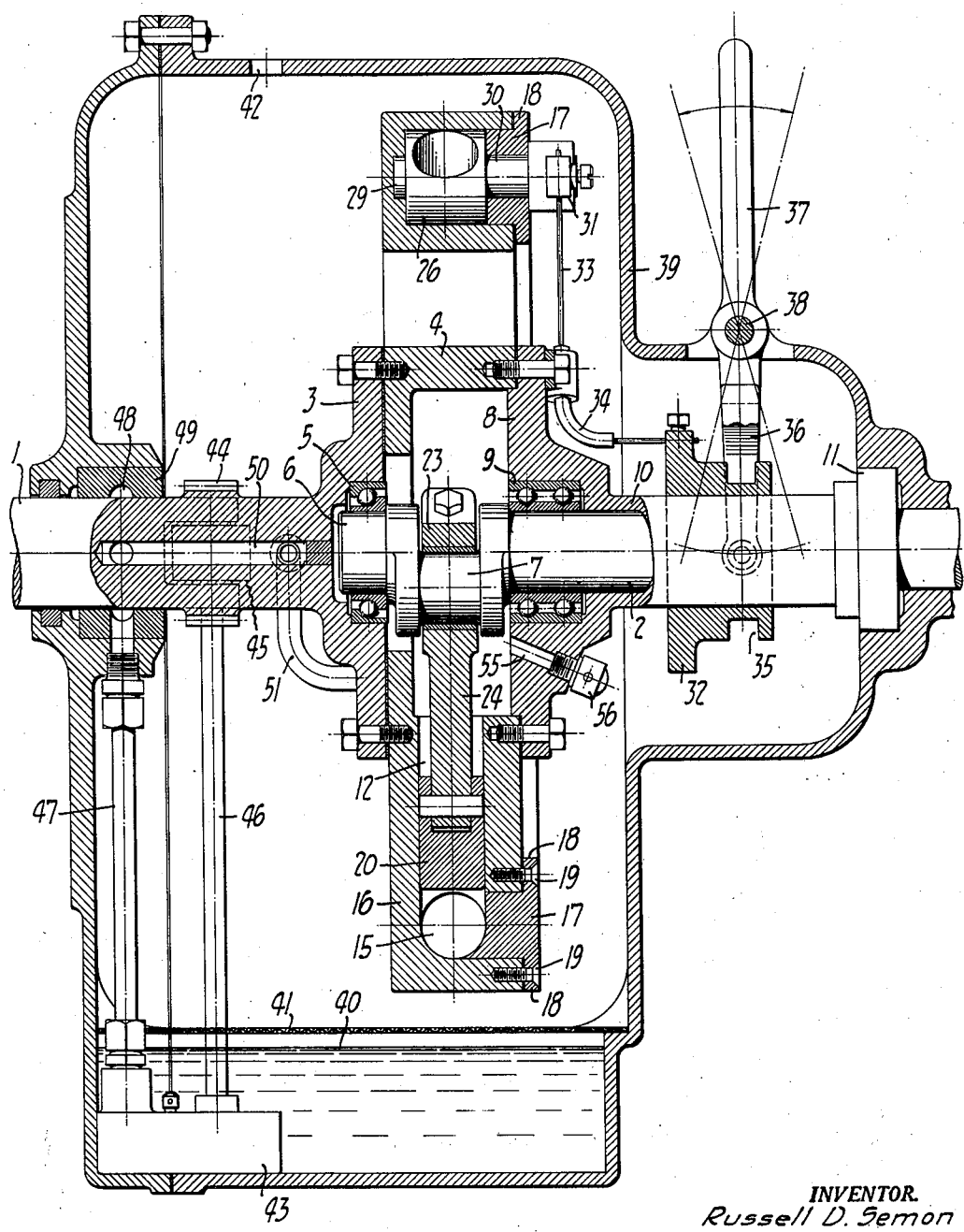
FIG_2_

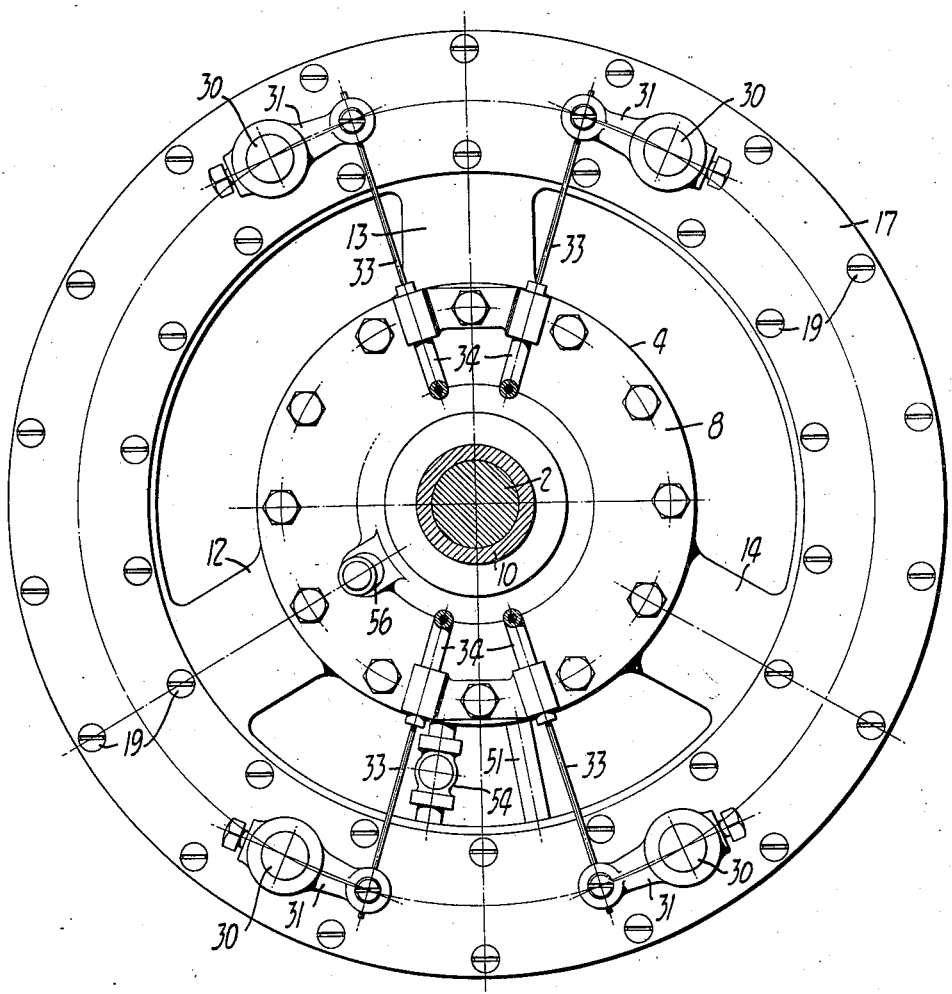

Patented Sept. 3, 1940

2,213,616

UNITED STATES PATENT OFFICE 2,213,616

ROTARY TRANSMISSION OR BRAKE

Russell D. Semon, Medford, Oreg.

Application January 16, 1939, Serial No. 251,129

3 Claims. (Cl. 192—60)

This invention relates to a transmission, clutch brake, or the like, in which there is a driving member and a driven member, and has for its objects a simple, compact device of the above character adapted to use a liquid medium, such as oil, for establishing a driving connection between the driven and driving members, and which liquid is controlled in a manner to prevent destructive overheating thereof. Another object is a device of the above character constructed to enable a substantially continuous changing of the liquid in the device during certain periods in the operation thereof. Other objects and advantages will appear in the specification and drawings.

In the drawings,

Fig. 1 is a sectional view through the body of my device, showing certain parts in elevation, but without the outer casing.

Fig. 2 is a sectional view taken along the line 2—2 of Fig. 1.

Fig. 3 is a sectional view showing one end of the body of my device in elevation.

The construction and operation of the device is as follows, it being understood that the driving and driven members, referred to, may be reversed as to their functions, the driving member becoming the driven member and the driven member becoming the driving member.

Briefly described, my device comprises a pair of axially aligned shafts 1, 2. Shaft 1 carries at one of its ends a flange 3 that forms one head of a cylindrical crank housing 4, which shaft is centrally recessed at its said end for a bearing 5 at one end 6 of shaft 2, the latter being formed with a crank 7 within said housing adjacent said one end of the latter shaft and which shaft 2 rotatably extends outwardly through head 8 closing the opposite end of the crank housing. Head 8 carries bearing 9, mounting said shaft 2, and a tubular sleeve 10 on head 8, extending outwardly therefrom, rotatably passes the shaft 2. A packing gland 11 at the outer end of sleeve 10 functions to form an oil tight seal between the outer end of the sleeve and said shaft.

Formed integrally with the cylindrical sides of the crank housing are three equally spaced radially outwardly projecting cylinders 12, 13 and 14, thus forming three pairs of adjacent cylinders. The inner ends of said cylinders open into the crank housing through the cylindrical side wall thereof, and the outer ends of said cylinders open into an annular, uniform diameter chamber 15.

The walls of chamber 15 are preferably in two separable annular pieces, one wall 16 being formed integrally with the cylinders, and said cylinders are integral with the cylindrical side 4 of the crank housing. An annular ring 17 closes the open side of the wall 16, and wall 16 is generally semi-cylindrical in cross-section on its side facing ring 17, while the adjacent side of ring 17 is similarly formed, whereby the two wall members 16, 17 when fitted together form the cylindrical walls of the annular chamber 15. Wall 17 is provided with flanges 18 and bolts 19 removably secure said wall to the wall 16, so that upon removing the bolts, the ring 17 can be removed.

Within each of the cylinders 12 to 14 is a piston 20 and two of the pistons are connected with crank 7 by a connecting rod 21, each rod pivotally connecting at one end with one piston in the usual manner, while the opposite ends of the rods pivotally connect at 22 with ears projecting from a block 23 rotatable on crank 7. A third ear 24 on block 23, and of a length substantially equal to the length of the rods 21, pivotally connects at its outer end with the third piston.

It will be seen from the foregoing, that upon holding shaft 2 stationary and revolving the crank housing, cylinders and annular chamber, which, as a unit, will be termed the driving member, in the direction of the arrow (Fig. 1) the pistons will successively reciprocate in the cylinders mounting the same, and assuming the annular chamber 15 is filled with oil, during such reciprocation, the oil displaced by the outwardly moving piston or pistons, will pass into the cylinder or cylinders in which an inward piston movement is being effected. Since the cross-sectional diameter of annular chamber 15 is preferably slightly greater than the cross-sectional diameter of the cylinders, there will be substantially no resistance to the movement of the pistons in the cylinders, until some restriction to flow is created in the annular chamber, but in the event of a restriction to said flow, the shaft 2 will tend to be rotated, and if all flow in cylinder 15 is stopped, then shafts 1 and 2 will rotate as a unit upon forceable rotation of either shaft.

Means for providing a control of the flow of oil in cylinders 12 to 14 is in the form of valves 25, 26, 27 and 28. Valves 25, 26 are at opposite sides of cylinder 13, in chamber 15, and valves 27, 28 are in the length of the chamber 15 between cylinders 12, 14. Said valves are of the rotary, plug type, each being formed with a through passageway adapted to extend in alignment with the chamber 15 and to move to closed position when rotated. One end of each valve is provided with a cylindrical extension 29 rotatably fitted in a recess in the wall 16 and the opposite end is formed with a shaft 30 rotatably extending through ring 17 to the outside. An arm 31 on each shaft, outside of ring 17, connects with a sleeve 32 that is reciprocable and rotatable on sleeve 10 by means of wires 33 that are secured at their opposite ends to said sleeve and to the arms 31. Said wires are longitudinally slidable in bearings 34 that are secured to head 8 in any suitable manner and are sufficiently rigid to rotate the valves when sleeve 32 is moved to the left (Fig. 2). The sleeve 32 is formed with an external, annular groove 35 for receiving the conventional inwardly directed pins on forks 36 of a shift lever 37, which lever may be pivoted at 38 to the housing 39 that encloses the device thus far described.

The arms 31 are positioned to be moved for simultaneously opening and closing the valve ports in the valves equally as the sleeve 32 is moved axially on sleeve 8 by actuation of the lever 37.

The housing 39 carries oil therein to the level 40, which is below the lowermost side of the walls of chamber 15, so that upon rotation of the chamber walls, there will be no unnecessary splashing of oil in the housing. A screen 41 extends over and is spaced above the oil level, which screen functions to break up oil dropping thereon, as will later be described, thus freeing any vapors or air that may be trapped therein, and housing 39 is ported at its upper side at 42 to the atmosphere.

Oil in the housing is supplied to the annular chamber 15 by means of a gear pump 43 operated by rotation of shaft 1 through a connection between gear 44 on said shaft 1 and gear 45 on pump drive shaft 46.

The oil passes from pump 43 through line 47 to an annular recess 48 in bearing 49, carried by housing 39, from which recess the oil passes through a port in shaft 1 to passageway 50 in shaft 1 from which the oil passes through a line 51 to annular chamber 15, where it passes through inlet port 52 into said chamber adjacent a side of valve 27 and between valves 27, 28. In the same length of chamber 15 that is disposed between valves 27, 28, but nearer valve 28, is an outlet port connected by a passageway 53 with the crank housing 4. In passageway 53 is a relief valve 54 adapted to pass oil from chamber 15 to the crank housing, at say about 50 lbs. pressure, and a conventional relief valve (Fig. 2) on the gear pump is adapted to function for maintaining delivery of oil from the gear pump to the annular chamber at a pressure in excess of 50 lbs. pressure in said annular chamber.

From the crank housing 4, a port 55 opens into the housing 39, and a relief valve 56 in said port is adapted to discharge oil in said crank housing at a very low pressure, say about one or several pounds.

In operation, it will be seen that upon rotation of the "driving" member, which is directly connected with shaft 1, the oil from the outer housing 39, or main supply reservoir, will be pumped by gear pump 43 into the length of annular chamber 15 between valves 27, 28 to keep the annular chamber, cylinders and the crank housing filled with oil against any chance for air to enter the annular chamber 15. The portion of annular chamber 15 disposed between valves 27, 28, and into which port 52 opens, may be regarded as a second reservoir receiving oil under pressure from the supply in the main reservoir, or from housing 39. The inner ends of the pistons are sealed by oil in the crank housing carried by centrifugal force thereagainst in the event it is found desirable to eliminate the relief valve 56 and to merely port the crank housing at a point spaced above the lowermost inner cylindrical side wall thereof, since the valve 54 functions principally to prevent possible drainage of oil from the crank housing during long periods of rest.

When the "driving" member of which annular chamber 15 is a part, is rotating relative to the crank carrying the pistons, the oil in said chamber 15 is successively forced around the chamber by the action of the pistons, but as soon as the oil passes valve 28, assuming the direction of movement is in the direction of the arrow, which is the direction of rotation of the chamber 15, the oil passes back under predetermined pressure, past valve 54 into the crank housing and thence through valve 56 to the main oil supply for cooling, should any heat be developed therein, but in actual practice, the small movement of the oil on the reciprocation of each piston, is so slight that the heat appears to be substantially dissipated by conduction through the walls of the chamber.

The importance of substantially isolating the area of chamber 15 between valves 27, 28 from the remaining length of the chamber to form a second reservoir intermediate the main source of oil supply and the remaining length of chamber 15, is apparent, since when the valves are moved to partially closed position, the pressure developed in the length of the annular chamber that is in direct communication with the several cylinders may be very high as related to the pressure in the length between valves 27, 28, thus permitting free pumping of oil into said latter length and insuring a proper injection of fresh oil into the chamber 15. It will be seen that the length of chamber 15 extending away from the area therein between valves 27, 28, virtually functions as a conduit as well as a chamber, for conducting the oil from said area to the outer ends of the cylinders.

This effective circulation of oil through the chamber 15 and into the crank housing and out, is vital to the successful operation of the device, in that it eliminates all chance of air getting into chamber 15 even though there is appreciable leakage of oil past pistons 29, and in ordinary practice, irrespective of the care taken, some leakage will be possible past said pistons.

More than three cylinders may be employed, as may manifestly be found desirable in particular installations.

In operation, assuming the shaft 1 is connected to the crank shaft of a motor, or to other source of power, and the shaft 2 is connected to a drive shaft for doing work, the operator merely moves the lever 37 in a direction for closing valves 25 to 28. As soon as the resistance to passage of oil past said valves becomes sufficiently great, the shaft 2 will revolve, and as the resistance increases the speed of shaft 2 will increase until the shafts 1 and 2 rotate at the same rate of speed. When valves 25 to 28 are fully closed, it is obvious that a direct positive drive will be established in which there is no movement of oil in passageway 15, except between valves 27, 28, and which oil, in said length, merely passes to the crank housing and out into the outer housing.

Having described my invention, I claim:

1. In a device of the character described, a shaft formed with a crank, a plurality of radially extending pistons connected with said crank for reciprocation upon rotation of the shaft, radially arranged cylinders connected at their outer ends with a member formed with an annular passageway into which the outer ends of the cylinders open, a central crank housing enclosing said crank and into which the inner ends of said cylinders open, said pistons being reciprocable in said cylinders, a source of liquid, means for supplying liquid under pressure from said source to said passageway and to the portions of the cylinders outwardly of the pistons and for maintaining said passageway and said portions completely filled with said liquid under pressure at all times, valve means in said passageway arranged and adapted to variably obstruct the free flow of liquid in said passageway past said valve means thereby causing variable resistance to the reciprocation of the pistons in said cylinders and causing said shaft and said member to tend to revolve together upon relative rotational movement of the shaft and member about said axis.

2. In a construction as defined in claim 1, means operative under predetermined pressure of liquid in said annular passageway for discharging liquid therein into said crank housing.

3. In a construction as defined in claim 1, said valve means including a pair of valves disposed in the length of the said annular passageway between a pair of adjacent cylinders, an inlet from said source opening into the said length that is between said pair of valves, and an outlet from said length opening into said crank housing.

4. In a device of the character described, a shaft formed with a crank, a plurality of radially extending pistons connected with said crank for reciprocation upon rotation of said shaft, radially arranged cylinders connected at their outer ends with a member formed with an annular passageway into which the outer ends of the cylinder open, a central crank housing enclosing said crank and into which the inner ends of said cylinders open, said pistons being reciprocable in said cylinders, a source of liquid, means for supplying liquid from said source to said passageway and to the portions of the cylinders outwardly of the pistons and for maintaining said passageway and said portions completely filled with said liquid, spaced valve means positioned in the length of said passageway between two adjacent pistons, arranged and adapted to variably obstruct the free flow of liquid in said passageway past said valve means thereby causing variable resistance to the reciprocation of the pistons in said cylinders and causing said shaft and said member to revolve together upon relative rotational movement of the shaft and member about said axis, a second passageway communicating at one end with said annular passageway at a point in said length thereof, and an inlet from said source also opening into said length of the annular passageway, the opposite end of said second passageway communicating with the interior of the crank housing, whereby liquid from said annular passageway will pass into said crank housing, and means for passing liquid from said crank housing back to said source.

5. In a construction as defined in claim 4, a pressure relief valve in said second passageway arranged and adapted to open only at a predetermined pressure of liquid in said annular passageway for permitting passage of the liquid from said annular passageway into said crank housing.

6. In a construction as defined in claim 4, said last mentioned means comprising a port opening in a side of said crank housing, and a pressure relief valve in said port arranged and adapted to open for permitting discharge of liquid from said crank housing only upon a predetermined pressure of liquid in said crank housing.

7. A rotary transmission device comprising a driving shaft and a driven shaft arranged in axial alignment, a crank and a plurality of radially disposed pistons connected to one end of the driving shaft for reciprocation upon rotation of said driving shaft, a crank housing secured to one end of the driven shaft enclosing said crank and carrying a plurality of radial cylinders reciprocably mounting said pistons, an annular chamber disposed coaxially of the shaft axes and extending across the outer ends of said cylinders, the walls of said chamber being carried by said cylinders, said cylinders opening at their inner and outer ends into said crank housing and annular chamber respectively, a source of liquid supply, spaced valve means in said chamber disposed in the length of said annular chamber between the outer ends of an adjacent pair of said cylinders, means providing for circulation of the liquid including a conduit for liquid under pressure opening into said annular chamber at a point between said spaced valve means, a conduit from said annular chamber to said crank housing, a liquid pump arranged and adapted to pump liquid from said source through said first mentioned conduit and into said annular chamber, and an outlet from said crank housing arranged to pass liquid from said housing back to said source.

8. In a device of the character described, a main supply reservoir for liquid, a second reservoir for liquid separate from said main supply reservoir, a plurality of cylinders, pistons reciprocable in said cylinders, means including a rotatably mounted shaft for reciprocating said pistons in said cylinders upon revolving said shaft, a crank housing enclosing said means separately from the liquid adapted to be contained in said main supply reservoir and said second reservoir and the inner ends of said cylinders opening into said housing, means mounting said cylinders and said crank housing for rotation relative to said shaft, pump means for supplying liquid under pressure from said main supply reservoir to said second reservoir, means for conducting the liquid under pressure from said second reservoir to the outer ends of each of said cylinders at points outwardly of the pistons therein, movable valve means for variably controlling the flow of liquid from said second reservoir to the outer ends of said cylinders, a passageway communicating between said second reservoir and said crank housing and a second passageway communicating between said crank housing and said main supply reservoir whereby the crank housing will receive liquid from said second reservoir and such liquid will return to said main supply reservoir for repassage back to said second reservoir.

RUSSELL D. SEMON.